ent [19] 3,881,210
Drach et al. [45] May 6, 1975

[54] FLUSHABLE, PRE-MOISTENED, SANITARY WIPER AND METHOD OF MANUFACTURING SAME

[75] Inventors: John E. Drach, Philadelphia, Pa.; Clifford John Roberts, Jr., Turnersville, N.J.

[73] Assignee: Scott Paper Company, Philadelphia, Pa.

[22] Filed: Mar. 24, 1972

[21] Appl. No.: 237,859

[52] U.S. Cl............ 15/104.93; 15/209 R; 128/296; 206/812; 252/90; 252/91; 161/73; 161/122; 161/128; 161/129; 161/249; 161/250; 161/251; 161/410
[51] Int. Cl.......... B08b 1/00; B32b 3/30; B32b 7/14
[58] Field of Search............ 161/73, 122, 128, 129, 161/250, 251, 410, 249; 15/104.93, 209 R; 206/46, 57, DIG. 17; 128/296; 252/90, 91

[56] References Cited
UNITED STATES PATENTS

| | | | |
|---|---|---|---|
| 2,038,957 | 4/1936 | Reach | 15/209 R |
| 2,840,080 | 6/1958 | Clark | 128/296 |
| 3,025,199 | 3/1962 | Harwood | 161/57 |
| 3,129,811 | 4/1964 | Williams | 206/46 |
| 3,226,153 | 1/1966 | Charlap | 15/104.93 |
| 3,263,241 | 8/1966 | Saulson | 161/128 |
| 3,414,927 | 12/1968 | Worcester | 206/DIG. 17 |
| 3,536,563 | 10/1970 | Brandts et al. | 161/250 |
| 3,554,788 | 1/1971 | Fechillas | 161/148 |
| 3,615,976 | 10/1971 | Endres et al. | 161/129 |
| 3,645,836 | 2/1972 | Torr | 161/410 |
| 3,650,882 | 3/1972 | Thomas | 161/122 |
| 3,654,928 | 4/1972 | Duehane | 128/296 |
| 3,661,695 | 5/1972 | Berliner | 161/251 |
| 3,762,987 | 10/1973 | Maruta et al. | 161/251 |

*Primary Examiner*—George F. Lesmes
*Assistant Examiner*—J. Cannon
*Attorney, Agent, or Firm*—Martin L. Faigus; William J. Foley

[57] ABSTRACT

A flushable, pre-moistened wiper includes a continuous reinforcing layer of a water-dispersible thermoplastic material, and continuous webs of soft, fibrous material of high flexibility and water absorbency are adhered to opposed major surfaces of the reinforcing layer. The continuous webs are adhered to the reinforcing layer in spaced regions comprising from between about 3% and about 25% of the surface area of the reinforcing layer. The webs have a moisture content of from between about 100% and about 350% by weight based on the dry weight of the fibers in the continuous webs.

A method of forming the above-described flushable, premoistened wiper includes the steps of applying moisture to each of two continuous webs of soft, fibrous material of high flexibility and water absorbency; patterning each of the moistened webs to provide a plurality of distal surfaces comprising from between about 3% and about 25% of the surface area of each of the continuous webs; positioning a continuous reinforcing layer of a water-dispersible thermoplastic material between the moistened and patterned fibrous webs and pressing the distal surfaces of the continuous webs into opposed major surfaces of the continuous reinforcing layer to thereby adhere the pre-moistened webs to the reinforcing layer.

7 Claims, 3 Drawing Figures

FLUSHABLE, PRE-MOISTENED, SANITARY WIPER AND METHOD OF MANUFACTURING SAME

BACKGROUND OF THE INVENTION

1. Field of the Invention

This invention relates to a flushable, pre-moistened wiper and to a method for manufacturing such a wiper.

2. Description of the Prior Art

Pre-moistened wipers are extremely popular for cleansing many portions of the human body. For example, such wipers have provided the means for cleansing parts of the human body under conditions where water, towels and the like are not available. One specific use for pre-moistened wipers is for cleansing excreta from the human anus, and usually after toilet paper has been used in the normal manner. In such an application the wiper is not a substitute for toilet paper, but provides the final cleansing operation after the bulk of the excreta has been removed in the usual manner.

Pre-moistened wipers have many other applications. For example, they can be used to clean parts of the body other than the anus, such as under the arms, face and/or neck.

Pre-moistened wipers are often stored for a long period of time, i.e. ½ to 2 years. Therefore, to remain functional, the pre-moistened wipers must retain sufficient structural integrity for their intended purpose during such a long period of time. In order to establish a long shelf life, the prior art pre-moistened wipers have usually included large percentages (i.e. 1½% – 4%) of wet strength resins, such as melamine resins and urea formaldehyde resins. Such wipers usually have such a high wet strength that they are not easily disposed of within the vortex of a toilet bowl. Flushability is an extremely desirable property, especially when the pre-moistened wiper is intended for use as an anal wipe as part of the normal cleansing function after a bowel movement. Moreover, the inclusion of a large percentage of a wet strength resin in a wiper tends to reduce the softness and flexibility of said wiper, and therefore, render the wiper quite harsh, and unsuitable for use on delicate parts of the human body. Prior art wet wipers of the type described above are disclosed in U.S. Pat. Nos. 3,129,811, issued to Williams and 2,840,080, issued to Clark.

In order to provide a fabric with high wet strength without using excessive quantities of wet strength resins, it has been suggested to laminate a pair of liners, such as crepe paper, to an intermediate layer of a thermoplastic material, as is disclosed in U.S. Pat. No. 3,536,563. Such fabrics have been disclosed for use as dry towels, and other dry sanitary products. Such products are generally intended for use in wiping up spills, and other foreign matter in a conventional manner, and these towels are usually disposed of after a single use. Such towels are not packaged in a pre-moistened condition and are not required to maintain structural integrity over a long period of time under the influence of large percentages of moisture, i.e. from between about 100% and about 350% by weight based on the dry weight fiber content of the liners. The prior art, substantially dry absorbent fabrics which include an intermediate layer of a thermoplastic material usually have a large percentage of the surface area of the absorbent liners adhered directly to the intermediate layer. This adherence of the absorbent liners to the intermediate layer provides excellent structural rigidity for the fabric. However, if such a fabric were packaged in a pre-moistened state with a moisture content of from between about 100% and 350% by weight based on the dry weight of the fibers in the liner, such a fabric would disintegrate, or become too weak over a relatively short period of time to adequately perform its intended function.

SUMMARY OF THE INVENTION

This invention relates to a flushable, pre-moistened wiper capable of being packaged in a wet condition for a long period of time, i.e. ½ to 2 years, without disintegrating or becomming so weak as to be incapable of performing its intended wiping function. The wiper of this invention includes a reinforcing layer of a water-dispersible thermoplastic material having opposed major surfaces, and a moistened web of a soft, fibrous material of high flexibility and water absorbency is adhered to each of said opposed surfaces in spaced regions comprising from between about 3% and about 25% of the surface area of the reinforcing layer. The webs of fibrous material have a minimum moisture content to permit moisture to drip therefrom when said webs are subjected to crumpling or wrinkling forces; and a maximum moisture content which does not permit moisture to drip therefrom only under the influence of gravitational force. Fibrous webs having a moisture content of from between about 100% and about 350% by weight based on the dry weight of the fibers in the webs normally meet the above-described requirements. In the most preferred embodiment of this invention the moisture content in the webs is maintained from between about 175% and about 210% by weight based on the dry weight of the fibers in the continuous webs. This later moisture content range is perceived to be most acceptable to the tactal sense of a user.

In the preferred embodiment of this invention each of the moistened fibrous webs have spaced distal surfaces separated by peak regions, and the spaced distal surfaces define from between about 3% and about 25% of the surface area of the webs. These spaced distal surfaces are adhered to the opposed major surfaces of the reinforcing layer, and the peak regions of the webs between the spaced distal surfaces are disposed out of engagement with their adjacent major surfaces of the reinforcing layer whereby the bulk of the pre-moistened wiper is enhanced. In addition, adjacent peak regions define pocket-like cavities therebetween for entrapping and retaining fecal, or other solid foreign matter. Preferably, the spaced distal surfaces of each of the fibrous webs are in substantial alignment through the thickness of the pre-moistened wiper to permit accurate control of the surface area of the reinforcing layer to which the fibrous webs are directly adhered.

In the preferred embodiment of this invention each web of fibrous material includes at least one ply of cellulosic wadding comprising short fibers of a papermaking length less than one-quarter inch. Preferably, woodpulp fibers, or second cut cotton linters are utilized in the webs because such fibers are relatively inexpensive, highly absorbent and easily disintegratable within the vortex of a toilet bowl.

Somewhat surprisingly, applicant has found that the reinforcing layer of water-dispersible thermoplastic material provides sufficient wet-strength for the pre-moistened wiper of this invention to permit the wiper to be stored for a long period of time, i.e. ½ to 2 years, without disintegrating or becomming so weak as to be incapable of performing its intended wiping function. Yet, the wiper of this invention is sufficiently dispersible such that it can be flushed in a conventional manner within the vortex of a toilet bowl. More specifically, applicant has found that if from between about 3% and about 25% of the reinforcing layer is adhered to the fibrous webs, the layer will provide the pre-moistened wiper with the requisite degree of wet strength to remain functional for its entire shelf life, i.e. ½ to 2 years. When the fibrous webs are adhered to the reinforcing layer over less than 3% of the surface area of the reinforcing layer, the wiper will delaminate either during storage or use. When the fibrous webs are adhered to over 25% of the surface area of the reinforcing layer, said reinforcing layer will be in engagement with such a large amount of moisture that said layer will disintegrate or become weakened to an unacceptable strength level over a period of time which is less than the required shelf life of the wiper.

This invention further relates to a method of forming a flushable, pre-moistened wiper including the steps of applying moisture to each of two continuous webs of soft, fibrous material of high flexibility and fluid absorbency; patterning said moistened webs by an embossing operation to provide a plurality of distal surfaces and peak regions, said distal surfaces comprising from between about 3% and about 25% of the surface area of each of said fibrous webs; positioning a continuous reinforcing layer of a water-dispersible thermoplastic material between the moistened and patterned fibrous webs and pressing the distal surfaces of the webs into opposed major surfaces of the reinforcing layer to adhere said distal surfaces to the reinforcing layer. The moisture in the distal surfaces of the webs causes the reinforcing layer to become tacky and thereby penetrate into the webs.

Surprisingly, applicant has found that by embossing the moistened webs to provide distal surfaces prior to adhering said webs to the reinforcing layer, the bulk of the wiper is enhanced beyond that which would normally be expected. To further explain, the wet bulk of both an embossed fibrous web and an unembossed fibrous web were determined to be substantially the same under a load of 235 gm/in.$^2$ on Federal Products Corporation Bulker Model 57B-1. However, the premoistened wiper formed by adhering the embossed moistened webs to the opposed surfaces of the reinforcing layer had a bulk over 50% greater than the bulk of the pre-moistened wiper in which the unembossed webs were adhered to the reinforcing layer. One would expect some increase in bulk by virtue of the fact that the peak regions of the embossed webs between secured distal surfaces are somewhat confined to a high loft condition by the reinforcing layer; however, an increase in bulk of over 50% was not expected.

In the preferred method of this invention the reinforcing layer is maintained in a stretched condition during the pressing operation in which the pre-moistened and patterned webs are adhered to the opposed major surfaces of the layer. The reinforcing layer is permitted to contract after the webs have been adhered to the opposed major surfaces thereof, whereby peak regions of the fibrous web between the adhered distal surface thereof raise and thereby further enhance the bulk of the wiper.

DESCRIPTION OF THE PREFERRED EMBODIMENTS OF THE INVENTION

Figure 1:
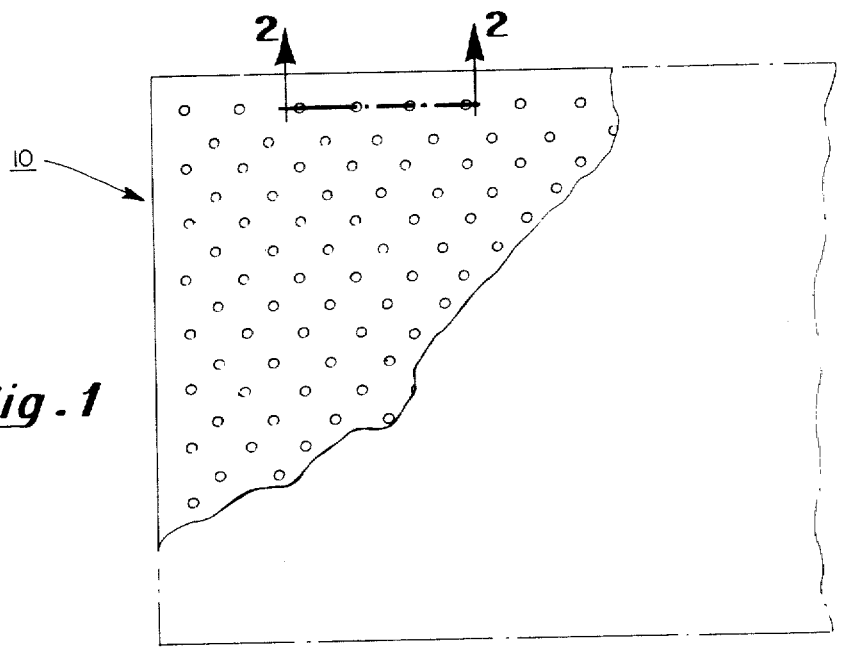
FIG. 1 is a plan view of a flushable, pre-moistened wiper according to this invention.
Figure 2:
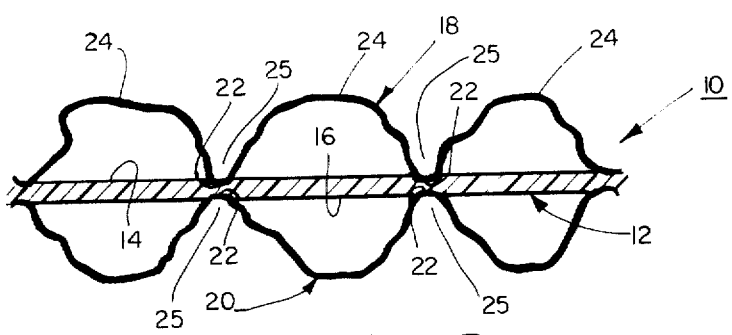
FIG. 2 is an enlarged sectional view taken along line 2—2 of FIG. 1.

Referring to FIGS. 1 and 2, a flushable, pre-moistened wiper 10 according to this invention includes a continuous reinforcing layer 12 of a water-dispersible thermoplastic material having opposed major surfaces 14 and 16. Continuous, moistened webs 18 and 20 of soft, fibrous material of high flexibility and water absorbency have spaced distal surfaces 22 adhered to the opposed major surfaces of the reinforcing layer over from between about 3% and about 25% of the surface area of said reinforcing layer. Below 3% surface area adherence, the fibrous webs 18 and 20 tend to delaminate from the reinforcing layer 12 either during use or during storage. Above 25% surface area adherence, the reinforcing layer 12 will be subjected to such a large moisture content that it will tend to disintegrate over a shorter period of time than the required shelf life of the wiper, i.e. ½ year to 2 years. If the reinforcing layer disintegrates, the wiper will lose its requisite wet strength to be utilized according to its intended function. In the preferred emobdiment of this invention the surface area bonding of the continuous webs 18 and 20 to the continuous reinforcing layer 12 is in the range of from about 4% to about 15% of the surface area of the reinforcing layer, and in the most preferred embodiment of the invention the range is from between about 4% to about 10%.

The fibrous webs 18 and 20 have a minimum moisture content to permit moisture to drip from the webs when said webs are subjected to crumpling or crinkling forces; and a maximum moisture content which does not permit moisture to drip therefrom only under the influence of gravitational force. Fibrous webs having a moisture content of from between about 100% and about 350% by weight based on the dry weight of the fibers in the webs normally meet the above requirements. In the most preferred embodiment of this invention the moisture content is maintained in the range of from between about 175% and about 210% by weight based on the dry weight of the fibers in the continuous webs 18 and 20. This latter moisture content range is perceived to be most acceptable to the tactal sense of a user.

In the preferred embodiment of this invention the continuous fibrous webs 18 and 20 have peak regions 24 between the distal surfaces and these peak regions are disposed out of engagement with the continuous reinforcing layer 12 to enhance the bulk of the wiper and to prevent exposure of the reinforcing layer 12 to excessive moisture levels. In addition, the peak regions 24 define pocket-like cavities 25 therebetween which provide the desirable function of entrapping and retaining fecal, or other solid foreign matter.

The fibrous webs employed in this invention can include any soft, fibrous material of high flexibility and water absorbency. In the preferred embodiment of this invention the continuous webs 18 and 20 are formed of cellulosic tissue paper having 100% short fibers of a papermaking length less than one-quarter inch. Such webs can be made by conventional processes from chemical pulps (kraft, sulfate or sulfite pulps), ground wood, cotton linters or mixtures thereof. A tissue grade of paper having a basis weight in the range of from about 10 to about 20 pounds per ream of 2,880 square feet has been found to be acceptable in the wipers of this invention. For some applications lower basis weight and higher basis weight webs can be utilized.

The reinforcing layer 12 includes a water-dispersible thermoplastic material which has sufficient strength when slightly moistened to impart the requisite wet strength to the pre-moistened wiper 10, and which will disperse, or disintegrate, upon being subjected to excessive quantities of moisture, such as the quantities of moisture encountered when the wiper is flushed within the vortex of a toilet bowl. Suitable thermoplastic materials include thin films of polyvinyl alcohol and water-dispersible polyvinyl acetate. Preferably, these films are relatively thin, having a thickness of from about 1 to about 3 mils, and a basis weight of from about 7 to about 20 pounds per ream of 2,880 square feet.

The moisturizing ingredient for the fibrous webs can include 100% volatile evaporating liquids such as water and alcohol, or such evaporating liquids with cleansing or treating agents therein. Representative cleansing agents are liquid soaps and wetting agents, detergents, emulsifying agents and solvents. Representative treating agents are humectants, such as glycerine, propylene glycol and similar hygroscopic materials; lanolin; fungicides; bacteriosides, etc. The specific moisturizing substances which are utilized are not intended as a limitation on the present invention, and can include other well known, or subsequently developed formulations.

Figure 3:
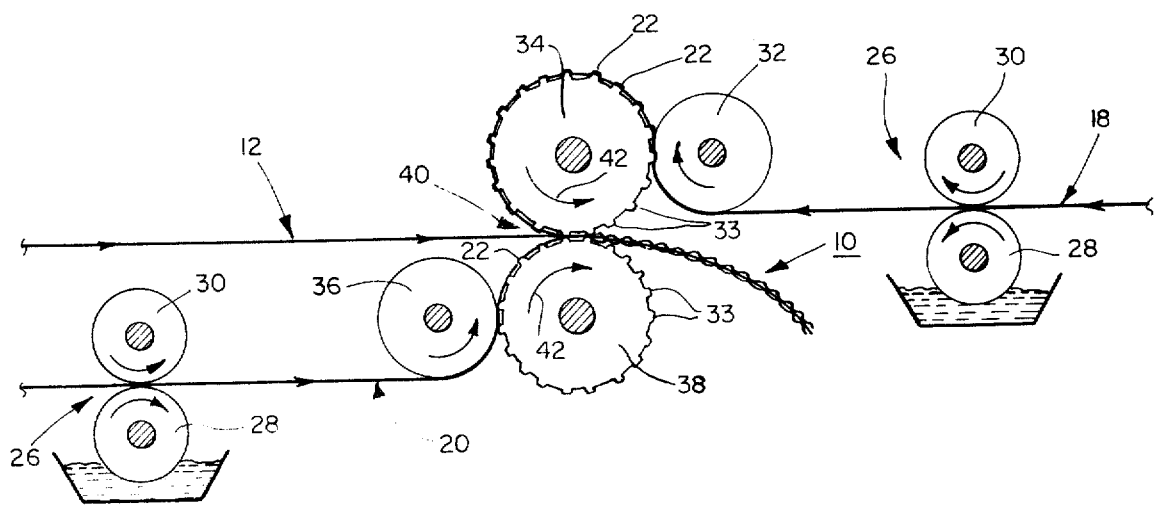
FIG. 3 is a schematic view of apparatus employed for carrying out the method of this invention.

Referring to FIG. 3, an apparatus is schematically shown for carrying out the method of this invention. Each of the continuous webs 18 and 20 are fed from a parent roll (not shown) through a moisturizing station 26 defined by a nip between a metal gravure printing roll 28 and a backup roll 30, which is preferably of a foam material, such as polyurethane foam. The web 18 passes around a rubber-covered or foam covered press roll 32, and between the nip defined by this press roll and a steel embossing roll 34. The continuous web 18 is patterned as it passes through the nip defined between the press roll 32 and embossing roll 34 to form a plurality of distal surfaces 22 disposed in overlying relationship with land areas 33 of the embossing roll 34. An identical pattern is impressed into the continuous fibrous web 20 by the action of the nip defined between a press roll 36 and a steel embossing roll 38. The embossing rolls 34 and 38 define a pressure nip 40 therebetween, and the continuous fibrous webs 18 and 20 remain in arcuate contact with the embossing pattern on the steel embossing rolls 34 and 38, respectively, as the rolls move in the direction indicated by the arrows 42. A continuous reinforcing layer 12 is fed from a parent roll (not shown) between the continuous fibrous webs 18 and 20, as these fibrous webs pass through the nip 40 defined between the embossing rolls 34 and 38. The steel embossing rolls are positively driven by suitable drive means (not shown) at identical surface speeds such that the land areas on the embossing roll 34 are aligned with the land areas on the embossing roll 38 to press the distal surfaces 22 of the continuous fibrous webs 18 and 20 into adhering engagement with the reinforcing layer 12, to form the flushable, pre-moistened wiper 10 of this invention. The moisture content in the fibrous webs soften the reinforcing layer to effect adherence of the fibrous webs to said reinforcing layer. The continuous wiper 10 can be fed to subsequent converting equipment (not shown) whereat the continuous wiper can be perforated, or separated into discrete sheets, as desired.

In the preferred embodiment of this invention, the continuous reinforcing layer 12 is maintained under tension to stretch the layer while the fibrous webs 18 and 20 are adhered thereto. This tension is released after the continuous webs 18 and 20 are adhered to the reinforcing layer whereby the reinforcing layer will contract and cause peak regions 24 of the continuous webs 18 and 20 to buckle up and thereby enhance the bulk of the product.

The following example is illustrative of the present invention. Two conventional wet creped sheets were delivered to separate moisturizing stations of the type disclosed in FIG. 3 and identified by the numeral 26. These wet creped sheets were identical, and were made from a pulp slurry of 70% Pictou (a bleached sulfate softwood) and 30% gum (a bleached sulfate hardwood) containing 0.125% ureaformaldehyde resin based on combined pulp weight. The webs were printed at the moisturizing stations by positively driving only the gravure printing rolls 28. The pressure between the gravure rolls 28 and their respective backup rolls 30 was sufficient to permit the backup rolls to be driven by the gravure rolls. Each of the sheets were provided with about 180% by weight based on the dry weight of the sheet of a printing fluid, which, in this example, included the following: 2% lanolin; 0.1% quaternary ammonium salt; 2.5% glycerine; 1.5% fungicide; 0.5% perfume and 95.2% water. Each printed web was then patterned by passing it through the nip defined by a 16 mesh embossing roll and a 40 durometer blue line urethane backup roll. A polyvinyl alcohol film having a thickness of about 1 mil was directed between the nip 40 defined by the embossing rolls 34 and 38 whereat the moistened sheets were adhered to the polyvinyl alcohol film.

What is claimed is:

1. A flushable, pre-moistened wiper usable for cleansing parts of the human body and capable of being packaged in a wet condition for its required life without disintegrating, said wiper comprising:

A. a reinforcing layer of water-dispersible thermoplastic material having opposed major surfaces, said reinforcing layer being dispersible upon being subjected to the moisture encountered during flushing within the vortex of a toilet bowl;

B. a web of soft, fibrous material of high flexibility and water absorbency adhered to each of said opposed surfaces of said reinforcing layer in spaced regions comprising from between about 3% and about 25% of the surface area of said reinforcing layer; and C. said continuous webs having a moisture content of from between about 100% and about 350% by weight based on the dry weight of the fibers in the continuous webs.

2. The wiper according to claim 1, wherein each web includes a plurality of spaced distal surfaces and peak regions, said spaced distal surfaces comprising from between about 3% and about 25% of the surface area of each web, said spaced distal surfaces being adhered to said reinforcing layer with said peak regions disposed out of engagement with corresponding major surfaces of the reinforcing layer.

3. The wiper according to claim 2, wherein the distal surfaces of one web are in alignment through the thickness of the wiper with distal surfaces of the other web.

4. The wiper according to claim 3, wherein each of said webs of fibrous material includes at least one ply of cellulosic wadding comprising short fibers of a papermaking length less than one-quarter inch.

5. The wiper according to claim 4, wherein said reinforcing layer is a polyvinyl alcohol film.

6. The wiper according to claim 3, wherein each web of fibrous material is adhered to the reinforcing layer in regions comprising from between about 4% and about 15% of the surface area of the reinforcing layer, and the moisture content within each web is between about 175% and about 210% based on the dry weight of the fibers in the webs.

7. The wiper according to claim 6, wherein each web of fibrous material is adhered to the reinforcing layer in regions comprising from between about 4% and about 10% of the surface area of the reinforcing layer.

* * * * *